United States Patent
Asadollahbaik et al.

(10) Patent No.: US 11,923,102 B2
(45) Date of Patent: Mar. 5, 2024

(54) OPTICAL TWEEZERS BASED ON TOTAL INTERNAL REFLECTION MICRO-OPTICS MOUNTED ON THE TIP OF A SINGLE MODE OPTICAL FIBER

(71) Applicant: Asa Asadollahbaik, Berlin (DE)

(72) Inventors: Asa Asadollahbaik, Berlin (DE); Simon Thiele, Stuttgart (DE); Alois Herkommer, Aalen (DE); Harald Giessen, Marnheim (DE); Jochen Fick, Villard de Lans (FR)

( * ) Notice: Subject to any disclaimer, the term of this patent is extended or adjusted under 35 U.S.C. 154(b) by 0 days.

(21) Appl. No.: 17/540,479

(22) Filed: Dec. 2, 2021

(65) Prior Publication Data
US 2022/0181041 A1   Jun. 9, 2022

(30) Foreign Application Priority Data
Dec. 4, 2020   (DE) .................... 20 2020 005 080.6

(51) Int. Cl.
*G21K 1/00*   (2006.01)
*G02B 21/32*   (2006.01)
*G21K 1/06*   (2006.01)

(52) U.S. Cl.
CPC ............. *G21K 1/006* (2013.01); *G21K 1/067* (2013.01); *G02B 21/32* (2013.01)

(58) Field of Classification Search
CPC ......... G21K 1/006; G21K 1/067; G02B 21/32
USPC ........................................... 250/251
See application file for complete search history.

(56) References Cited

U.S. PATENT DOCUMENTS

| | | | |
|---|---|---|---|
| 10,827,911 B2* | 11/2020 | Ramachandran .. | G02B 6/02071 |
| 2010/0120113 A1* | 5/2010 | Mohanty ................ | G02B 21/32 |
| | | | 385/33 |
| 2016/0139050 A1* | 5/2016 | Wuite ............... | B01L 3/502761 |
| | | | 250/459.1 |
| 2018/0217385 A1* | 8/2018 | Rivera ................. | G02B 6/0288 |
| 2020/0110276 A1* | 4/2020 | Muendel ............ | G02B 6/02052 |

OTHER PUBLICATIONS

Chantakit, Teanchai et al. "All-dielectric silicon metalens for two-dimensional particle manipulation in optical tweezers", Photonics Research, vol. 8, No. 9, Sep. 2020.
Deng, Hongchang et al., "Fiber-Based Optical Gun For Particle Shooting", ACS Photonics, DOI: 10.1021/acsphotonics.6b01010, 2017, pp. 642-648.

(Continued)

*Primary Examiner* — Nicole M Ippolito
(74) *Attorney, Agent, or Firm* — Harness, Dickey & Pierce, P.L.C.

(57) ABSTRACT

The present disclosure relates to a rotationally symmetric dielectric structure for optical beam shaping and for trapping and manipulating individual particles and living biological cells in aqueous medium, concentrically mounted on the facet of a single-mode optical fiber, wherein the structure comprises at least three total reflection surfaces configured to split a light field emerging from the single-mode optical fiber into at least two separate light paths and wherein the at least three total reflection surfaces are further configured to bring the separate light paths together as a ring beam in a common focal point.

14 Claims, 2 Drawing Sheets

(56) References Cited

OTHER PUBLICATIONS

Hu, Zhaohui et al., "Manipulation and arrangement of biological and dielectric particles by a lensed fiber probe", Optics Express, vol. 12, No. 17, pp. 4123-4128, Sep. 2004.

Liberale, C. et al., "Integrated microfludic device for single-cell trapping and spectroscopy", Scientific Reports, DOI: 10.1038/srep01258, 2013.

Liu, Zhihai et al., "Tapered fiber optical tweezers for microscopic particle trapping: fabrication and application", Optics Express, vol. 14, No. 25, pp. 12510-12516, 2006.

Liu, Zhihai et al., "Single-fiber tweezers applied for dye lasing in a fluid droplet", Optics Letters, vol. 41, No. 13, pp. 2966-2969, Jul. 2016.

Liu, Zhihai et al., "Single fiber optical trapping of a liquid droplet and its application in microresonator", Optics Communications, 2016, http://dx.doi.org/10.1016/j.optcom.2016.07.046.

Ribeiro, Rita S. Rodrigues et al., "Optical Fiber Tweezers Fabricated by Guided Wave Photo-Polymerization", doi:10.3390/photonics 2020634, pp. 634-645, 2015.

Riberio, Rita S. Rodrigues et al., "Fabrication of Fresnel plates on optical fibres by FIB milling for optical trapping, manipulation and detection of single cells", Scientific Reports, DOI: 10.1038/s41598-017-04490-2, 2017.

Taylor, R.S. et al., "Particle trapping in 3-D using a single fiber probe with an annular light distribution", Optics Express, vol. 11, No. 21, pp. 2775-2782, 2003.

Taguchi, K. et al., "Rotational manipulation of a yeast cell using optical fibres", Electronics Letters, vol. 33, No. 14, pp. 1249-1250, Jul. 1997.

Reddy, Innem V.A.K. et al., "3D mircor-printed hybrid photonic structure for single-fiber Optical Tweezers", Conference on Lasers and Electro-Optics Europe & European Quantum Electronics Conference (CLEO/Europe-EQEC), DOI: 10.1109/CLEO/Europe-EQEC52157.2021.9541618, 2021.

\* cited by examiner

OPTICAL TWEEZERS BASED ON TOTAL INTERNAL REFLECTION MICRO-OPTICS MOUNTED ON THE TIP OF A SINGLE MODE OPTICAL FIBER

CROSS-REFERENCE TO RELATED APPLICATION

This application claims priority to German Application No. 20 2020 005 080.6, filed on Dec. 4, 2020. The disclosure of the above application is incorporated herein by reference.

FIELD OF THE APPLICATION

The present disclosure relates to a rotationally symmetric dielectric structure, particularly for optical beam shaping and for trapping and manipulating individual particles and living biological cells in aqueous medium. Further, the disclosure comprises optical tweezers based on total internal reflection micro-optics mounted on the tip of a single-mode optical fiber.

BACKGROUND OF THE APPLICATION

Optical trapping is one of the most important functions in the study of single cells in biophysics, biochemistry and health sciences. However, in its conventional form (high numerical aperture (NA) microscope objectives), it has not yet been fully applied to in vivo applications. This is due to the following reasons: Light field distortions are caused by optical distortions that occur in highly turbid media such as thick biological tissue. In addition, access to confined spaces is limited by the bulky optical setup, and the working distance is limited due to the short focal point of the trap lenses, which limits the ability to integrate optical trapping with other experiments. To find an alternative, optical fibers have attracted much attention because they can guide the light to the desired point while preserving it from aberrations and distortions. However, for a highly focused beam produced by a single-mode optical fiber, additional optics must be added to the tip of the optical fiber. Considering the difference between the refractive index of the optics and the immersion medium, the generation of such a highly focused beam for in vivo applications requires sharp curved surfaces for which the tolerances of current fabrication techniques may not be sufficient. At the same time, the working distances of highly focused beams are very small, limiting the freedom to integrate optical trapping with other functions.

The generation of optical traps using a standard single-mode fiber has not been straightforward. There have been reports of microstructured optical fibers with lenticular tips [1-3], sharp tips [4], custom structures for generating structured light [5], diffractive object elements [6], and even silicon-based metal lenses [7] that can trap particles, but none of these can provide a 3D optical trap. In all cases, the axial force is too high (or even too low), so only 2D trapping in the transverse plane is possible. Trapping in the axial direction is achieved either by electrostatic forces between the particle and the tip of the optical element or fiber, or by holding it against the glass slide or the wall of the chamber.

To enable 3D optical trapping using a device on the scale of optical fibers, Liberale et al [8] demonstrated a four-bundle optical fiber to create a counter-propagating trap using tilted beams. The result is a focal spot which provides efficient trapping for a wide range of particle sizes and types at a working distance of 46 μm. According to another approach, a hollow-core photonic crystal fiber with a polished tip was used to create a focused annular beam. For this fiber, trapping of oil droplets at a large working distance of about 30 μm from the lens tip [9] was successfully demonstrated and later used for droplet lasing [10] and particle shooting [11]. In another work, Liberale group have designed a hybrid photonic structure that can be used for optical trapping of single particles. However, they are yet to show that the aforementioned structure works on the tip of an optical fiber. [12]

While none of the current solutions are single-mode optical fibers capable of generating full 3D optical traps, the drawbacks of the current solutions are summarized below:
- 2D trapping only (trapping in the transverse plane).
- In the case of 3D trapping, current solutions either require at least two single-mode fibers for trapping. Or they require a photonic crystal optical fiber with a ring core, and in addition the tip of the fiber has to be modified, which is a less flexible and perhaps even costly approach.

SUMMARY

The present disclosure uses beam forming/shaping as a solution to overcome the need for highly focused Gaussian beams. By designing a micro-optical component at the tip of a single mode optical fiber, a focused annular beam is created that distributes optical forces and creates an optical trap for a variety of particles in terms of size and type at a large distance from the tip of the fiber (large working distance).

The current disclosure enables miniaturization of optical tweezers to the size of a single optical fiber, which was previously not possible. This is a great advantage for the field of optical trapping and manipulation in health sciences, biophysics and chemistry and opens up new applications for trapping, manipulation and investigation in vivo.

The disclosure is defined in the independent claims. Dependent claims describe preferred embodiments.

The present disclosure relates to a rotationally symmetric dielectric structure for optical beam shaping and for trapping and manipulating individual particles and living biological cells in aqueous medium, concentrically mounted on the facet of a single-mode optical fiber, wherein the structure comprises at least three total reflection surfaces configured to split a light field emerging from the single-mode optical fiber into at least two separate light paths and wherein the at least three total reflection surfaces are further configured to bring the separate light paths together as a ring beam in a common focal point.

Various embodiments may preferably implement the following features.

According to an embodiment, the structure and the optical fiber have a common axis of symmetry. Preferably, a first total reflection surface is configured in such a way that a first light path of the emerging light field, whose radial distance from the axis of symmetry is smaller than a threshold value, is reflected away from the axis of symmetry in the direction of a second total reflection surface and the second total reflection surface is configured to direct the light path into the focal point.

According to an embodiment, a third total reflection surface is configured such that a second light path of the emerging light field whose radial distance from the axis of symmetry is greater than the threshold value is directed onto the focal point.

According to an embodiment, the structure is configured such that the second and third light paths are within a numerical aperture of the optical fiber.

According to an embodiment, the total reflection surfaces are configured such that a difference of an optical path length of the facet to the focal point between the first light path and the second light path is an integer multiple of a light wavelength in an ambient medium.

According to an embodiment, the total reflection surfaces are configured to achieve a total internal reflection for an ambient refractive index between 1 and 1.4.

According to an embodiment, a surface at which the light field emerges from the structure is concentric with the focal point.

According to an embodiment, the structure is configured such that a ratio between a length of a propagation path of a widening of the beam and a remaining length of the structure is in a range of 0.5 and 5.

According to an embodiment, a numerical aperture for focusing light in an ambient medium is between 0.3 and 1.5.

According to an embodiment, the structure is configured to trap particles and to direct light scattered from the trapped particles into the optical fiber.

According to an embodiment, the focal point of the structure is configured to act as optical tweezers to trap particles and/or cells.

The present disclosure also encompasses a single mode optical fiber having a structure as described above.

Furthermore, the present disclosure encompasses a beam forming system comprising a single mode optical fiber according as described above having a structure as described above, wherein the optical fiber is configured to be movable in an axial and/or transverse direction with respect to a common axis of symmetry and wherein the structure is configured to hold the position of a trapped particle.

The present disclosure also relates to a method of manufacturing a rotationally symmetric dielectric structure for beam shaping as described above, wherein the structure is fabricated directly on a fiber tip using 3D printing or fabricated on a substrate and then attached to the fiber.

BRIEF DESCRIPTION OF DRAWINGS

The disclosure is further described with reference to the appended figures. Therein show FIGS. 1A to 1C beam diagrams of the structure according to an exemplary embodiment of the disclosure, and FIG. 2 a three-dimensional representation of the front part of the structure according to FIGS. 1A to 1C with the sector cut open.

DETAILED DESCRIPTION

In the present disclosure, a focused annular beam is used but is generated/produced from a standard single-mode optical fiber. The present disclosure shows a standard single-mode optical fiber with a 3D-printed micro-structured probe at the tip, which generates/produces a focused annular beam with a numerical aperture NA≈1 at the focal point 50 μm away from the fiber (cf. FIGS. 1 and 2).

The optical design of the probe was conceived with a number of specific requirements: The probe should provide focusing at a high numerical aperture while maintaining annular illumination to avoid axial optical forces. In addition, a maximum amount of the light exiting the single-mode fiber (SMF) should be guided to the focal point to avoid losing optical power for trapping. Finally, the device should function in water without the need for post-processing or additional steps.

Figure 1:
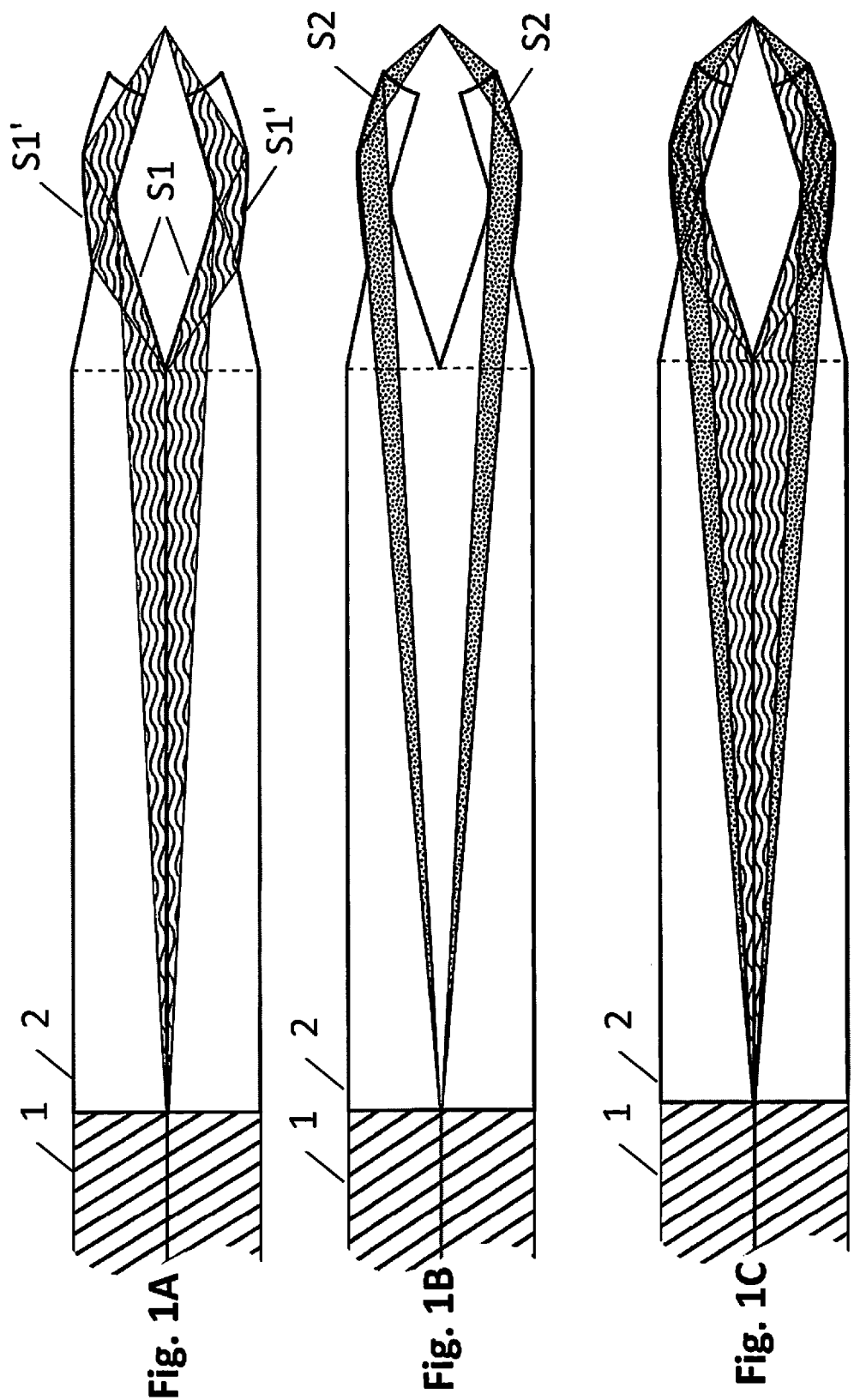

In accordance with the present disclosure, a purely reflective structure or probe is provided based on total internal reflection (TIR) with a focusing NA of about or equal to 1.0 and a back focal length of 50 μm. To obtain TIR at all surfaces, all reflection angles should be kept above the critical angle. Considering the small difference between the refractive index of water (as the trapping medium) and the probe (building) material (Nanoscribe IP-DIP photopolymer in the present example), the critical angle at the design wavelength of 808 nm is 59.6°. As a result, the Gaussian beam exiting the facet or ground surface of the SMF is expanded over a length of 500 μm with an NA of 0.13 (characteristic of 780HP fibers in air) and then split into two distinct paths, as shown in FIGS. 1 a) to c). The structure and the optical fiber preferably share a common axis of symmetry. Here, the first path is shown hatched having a wave shape and comprises light having a radial distance less than a first threshold, while the second path is shown as a dotted area and thus comprises light having a radial distance greater than the first threshold and less than a second threshold. The end surface at which the light leaves the probe is curved and matches the shape of the wavefront to avoid any refraction. This also means that the design works independent of the wavelength and immersion medium, as long as the surrounding refractive index is that of water or lower.

Figure 2:
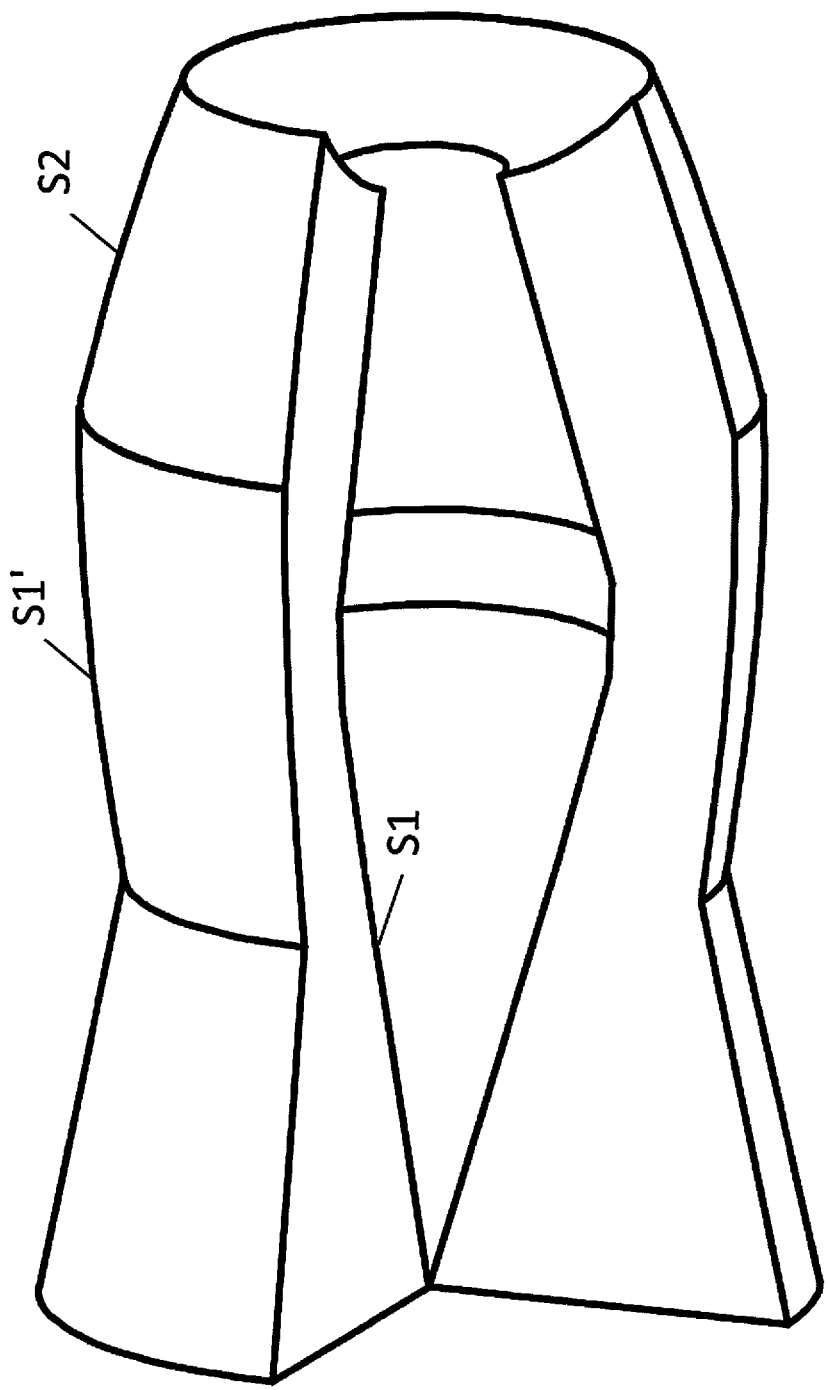

Referring to FIGS. 1 and 2, a rotationally symmetric dielectric structure for optical beam shaping and for trapping and manipulating individual particles and living biological cells in aqueous medium is described, concentrically mounted on the facet of a single-mode optical fiber. The structure has at least three total reflection surfaces S1, S1', S2 configured to split a light field emerging from the single-mode optical fiber into at least two separate light paths. The at least three total reflection surfaces S1, S1', S2 are further configured to combine the separate light paths as a ring beam in a common focal point.

As mentioned above, the structure and the optical fiber have a common axis of symmetry. A first total reflection surface S1 is configured such that a first light path of the emergent light field, whose radial distance from the axis of symmetry is less than a threshold value, is reflected away from the axis of symmetry towards a second total reflection surface S1'. The threshold value is equal to the maximum distance of the total reflection surface S1 from the symmetry axis. The second total reflection surface S1' is configured to direct the light path into the focal point. This configuration is shown in FIG. 1a). The area marked with wave shaped hatching indicates the first light path. Reference numeral 1 denotes the optical (single mode) glass fiber and reference numeral 2 denotes an expansion cylinder of the rotationally symmetric dielectric beam forming structure.

A third total reflection surface S2 is configured such that a second light path of the emergent light field, whose radial distance from the symmetry axis is greater than the threshold value, is directed to the focal point. The second light path thus comprises light whose radial distance from the common axis of symmetry is greater than the maximum distance of the total reflection surface S1 from the axis of symmetry and smaller than the minimum distance of the total reflection surface S1' from the axis of symmetry. This is shown in FIG. 1b), wherein the dotted area indicates the second light path.

FIG. 1c) shows a superposition of the first and second light path according to FIGS. 1a) and 1b).

FIG. 2 shows a three-dimensional representation of the front part of the structure according to FIG. 1 with the sector cut open.

The second and third light paths are located within a numerical aperture of the optical fiber.

The total reflection surfaces S1, S1', S2 are configured such that a difference of an optical path length of the facet to the focal point between the first light path and the second light path is an integer multiple of a light wavelength in an ambient medium. Furthermore, a total internal reflection is preferably achieved for an ambient refractive index between 1 and 1.4.

A surface where the light field exits the structure is concentric with the focal point.

The ratio between the length of the propagation path to expand the beam and the remaining length of the structure is preferably in the range of 0.5 and 5.

A numerical aperture for focusing light in an ambient medium is preferably between 0.3 and 1.5.

The structure is configured to trap particles and to direct light scattered from the trapped particles into the optical fiber. The focal point of the structure is configured to act as optical tweezers to trap particles and/or cells.

The disclosure further comprises a single mode optical fiber having a structure as described above.

Further, the disclosure comprises a beam forming system comprising a single mode optical fiber having a structure as described above, wherein the optical fiber is configured to be movable in an axial and/or transverse direction with respect to a common axis of symmetry, and wherein the structure is configured to hold the position of a trapped particle.

Further disclosed is a method of fabricating a rotationally symmetric dielectric structure for beam shaping as described above, wherein the structure is fabricated directly on a fiber optic tip using 3D printing or fabricated on a substrate and then attached to the fiber.

Since the probe is a rotationally symmetric design, the final probe is constructed iteratively in 2D (along the beam axis) by manually tracing beams from the fiber core to the focus and solving sets of equations numerically to satisfy all external boundary conditions while adhering to the law of reflection (as well as total internal reflection) to ensure that the correct reflection angles are achieved. The resulting shapes are then fitted with piecewise defined polynomials (splines), which are then exported and converted to a 3D model in, for example, Solidworks CAD software.

The microstructured optics, which use total internal reflection to shape or modify a Gaussian beam (intrinsic mode of the single-mode fiber), can produce a highly focused ring beam without losing the high intensity portion of the beam.

The large distance of the trapped particle to the fiber tip (large working distance) is an advantage that gives the freedom to further manipulate the trapped particle, and at the same time the current design also collects the backscattered signal from the trapped particle or cell. Such an advantage can be used for collecting Raman or fluorescence signals from particles and cells for further studies of interest.

Although the disclosure is illustrated and described in detail by means of the figures and the accompanying description, this illustration and this detailed description are to be understood as illustrative and exemplary and not as limiting the disclosure. It is understood that skilled persons may make modifications and variations without departing from the scope of the following claims. In particular, the disclosure also encompasses embodiments having any combination of features recited or shown above with respect to various aspects and/or embodiments.

The disclosure also includes individual features shown in the figures even if they are shown there in connection with other features and/or are not mentioned above.

Further, the expression "include" and derivatives thereof does not exclude other elements or steps. Likewise, the indefinite article "a" or "one" and derivatives thereof does not exclude a plurality. The functions of multiple features recited in the claims may be performed by a single entity. The terms "substantially", "about", "approximately" and the like in connection with a characteristic or a value, respectively, also define in particular precisely the characteristic or precisely the value, respectively. All reference signs in the claims are not to be understood as limiting the scope of the claims.

The disclosure is further described by the following aspects.

1. A rotationally symmetric dielectric structure for optical beam shaping and for trapping and manipulating individual particles and living biological cells in aqueous medium, concentrically mounted on the facet of a single-mode optical fiber, wherein the emerging light field is first expanded by free propagation and then split by means of at least three total reflection surfaces into at least two separate light paths which subsequently emerge from the structure merged into a ring beam and converge at a common focal point having the necessary properties for trapping particles.

2. Rotationally symmetrical dielectric structure for beam shaping according to aspect 1, wherein light components which propagate close to the common axis of symmetry of the glass fiber and the structure (internal light components) are reflected away from the axis of symmetry by a first total reflection surface (S1) and are directed into the focal point by a second total reflection surface (S1') (light path L1).

3. A rotationally symmetric dielectric structure for beam shaping according to one or more of the preceding aspects, wherein light components which do not propagate close to the common axis of symmetry of the optical fiber and the structure (outer light components) are directed into the focal point (light path L2) by a single total reflection surface (S2).

4. A rotationally symmetric dielectric structure for beam shaping according to one or more of the preceding aspects, wherein all light components within the numerical aperture of the fiber do not take light paths other than those described in aspects 2 and 3.

5. A rotationally symmetric dielectric structure for beam shaping according to one or more of the preceding aspects, wherein the difference in optical path length from fiber facet to focal point between the two light paths of aspects 2 and 3 is an integer multiple of the wavelength of light in the ambient medium.

6. A rotationally symmetric dielectric structure for beam shaping according to one or more of the preceding aspects, wherein the condition for total internal reflection at the total reflection surfaces is satisfied over a range of ambient refractive index of 1-1.4.

7. A rotationally symmetric dielectric structure for beam shaping according to one or more of the preceding aspects, wherein the surface at which light exits the structure is concentric with the focal point so that no refraction occurs and focusing is independent of the wavelength of light (achromatic).

8. A rotationally symmetric dielectric beam forming structure according to one or more of the preceding aspects, wherein the ratio of the length of the propagation path for expanding the beam to the remaining length of the structure ranges from 0.5 to 5.

9. A rotationally symmetric dielectric structure for beam shaping according to one or more of the preceding aspects, wherein the numerical aperture at which the light is focused in the ambient medium is in a range between 0.3 and 1.5.

10. A rotationally symmetric dielectric structure for beam shaping according to one or more of the preceding aspects, wherein the structure is fabricated directly on a glass fiber tip by means of 3D printing or, as a second variant, is first fabricated on a further substrate and subsequently attached to the fiber.

11. A rotationally symmetric dielectric structure for beam shaping according to one or more of the preceding aspects, wherein light from the structure is used to trap particles (optical tweezers), the particles are excited to glow by the same or a different wavelength, and the emitted light is guided back into the fiber by the structure.

12. A rotationally symmetric dielectric structure for beam shaping according to one or more of the preceding aspects, wherein light from the structure is used to trap particles (optical tweezers), the particles are illuminated by the same or a different wavelength, and the reflected light is guided back into the fiber by the structure.

13. A rotationally symmetric dielectric structure for beam shaping according to one or more of the preceding aspects, wherein the optical focus generated at the front of the dielectric structure generates an equilibrium state of forces which traps individual particles and cells and acts like optical tweezers.

14. A rotationally symmetric dielectric structure for beam-forming according to one or more of the preceding aspects, wherein the trapped particle or cell can be moved (optically manipulated) by moving the single-mode fiber in axial and transverse directions while the trapped particle maintains its position relative to the fiber.

REFERENCE LIST

[1] Hu, Z., Wang, J. & Liang, J. Manipulation and arrangement of biological and dielectric particles by a lensed fiber probe. Opt. Express12, 4123-4128, DOI: 10.1364/OPEX.12.004123 (2004).
[2] Taguchi, K., Ueno, H. & Ikeda, M. Rotational manipulation of a yeast cell using optical fibers. Electron. Lett. 33, 1249-1250 (1997).
[3] Ribeiro, R. S. R., Queirós, R., Soppera, O., Guerreiro, A. & Jorge, P. A. Optical fiber tweezers fabricated by guided wavephoto-polymerization. InPhotonics, vol. 2, 634-645 (Multidisciplinary Digital Publishing Institute, 2015).
[4] Liu, Z, Guo, C, Yang, J. & Yuan, L. Tapered fiber optical tweezers for microscopic particle trapping: fabrication and application. Opt. express14, 12510-12516 (2006).
[5] Taylor, R. & Hnatovsky, C. Particle trapping in 3-d using a single fiber probe with an annular light distribution. Opt. ExpressII, 2775-2782 (2003).
[6] Ribeiro, R. S. R., Dahal, P., Guerreiro, A., Jorge, P. A. & Viegas, J. Fabrication of fresnel plates on optical fibers by fibmilling for optical trapping, manipulation and detection of single cells. Sci. reports 7, 4485 (2017).
[7] Chantakit, T. et al. All-dielectric silicon metalens for two-dimensional particle manipulation in optical tweezers. Photon. Res. 8, 1435-1440, DOI: 10.1364/PRj.389200 (2020).
[8] Liberale, C. et al. Integrated microfluidic device for single-cell trapping and spectroscopy. Scie. Rep. 3, 1258 (2013).
[9] Liu, Z. et al. Single fiber optical trapping of a liquid droplet and its application in microresonator. Opt. Commun. 381, 371-376 (2016).
[10] Liu, Z. et al. Single-fiber tweezers applied for dye lasing in a fluid droplet. Opt. Lett. 41, 2966-2969, DOI: 10.1364/OL.41.002966 (2016).
[11] Deng, H. et al. Fiber-based optical gun for particle shooting. ACS Photonics 4, 642-648 (2017).
[12] Reddy, Innem V A K., Andrea Bertoncini, and Carlo Liberale. 3D micro-printed hybrid photonic structure for single-fiber Optical Tweezers, The European Conference on Lasers and Electro-Optics. Optical Society of America (2021).

The invention claimed is:

1. A rotationally symmetric dielectric structure for optical beam shaping and for trapping and manipulating individual particles and living biological cells in aqueous medium, concentrically mounted on the facet of a single-mode optical fiber,
    wherein the structure comprises at least three total reflection surfaces (S1, S1', S2) configured to split a light field emerging from the single-mode optical fiber into at least two separate light paths, and
    wherein the at least three total reflection surfaces (S1, S1', S2) are further configured to bring the separate light paths together as a ring beam in a common focal point.

2. The rotationally symmetric dielectric structure for beam shaping according to claim 1,
    the structure and the optical fiber having a common axis of symmetry, and
    a first total reflection surface (S1) being configured in such a way that a first light path of the emerging light field, whose radial distance from the axis of symmetry is smaller than a threshold value, is reflected away from the axis of symmetry in the direction of a second total reflection surface (S1'), and
    wherein the second total reflection surface (S1') is configured to direct the light path into the focal point.

3. The rotationally symmetric dielectric structure for beam shaping according to claim 2,
    wherein a third total reflection surface (S2) is configured such that a second light path of the emerging light field whose radial distance from the axis of symmetry is greater than the threshold value is directed onto the focal point.

4. The rotationally symmetric dielectric structure for beam shaping according to claim 3,
    wherein the structure is configured such that the second and third light paths are within a numerical aperture of the optical fiber.

5. The rotationally symmetric dielectric structure for beam forming according to claim 3,
    wherein the total reflection surfaces (S1, S1', S2) are configured such that a difference of an optical path length of the facet to the focal point between the first light path and the second light path is an integer multiple of a light wavelength in an ambient medium.

6. The rotationally symmetric dielectric structure for beam forming according to claim 1,
    wherein the total reflection surfaces (S1, S1', S2) are configured to achieve a total reflection for an ambient refractive index between 1 and 1.4.

7. The rotationally symmetric dielectric beam shaping structure according to claim 1, wherein a surface at which the light field emerges from the structure is concentric with the focal point.

8. The rotationally symmetric dielectric beam shaping structure according to claim 1,
wherein the structure is configured such that a ratio between a length of a propagation path of a widening of the beam and a remaining length of the structure is in a range of 0.5 and 5.

9. The rotationally symmetric dielectric beam shaping structure according to claim 1,
wherein a numerical aperture for focusing light in an ambient medium is between 0.3 and 1.5.

10. The rotationally symmetric dielectric beam shaping structure according to claim 1,
wherein the structure is configured to trap particles and to direct light emitted from the trapped particles into the optical fiber.

11. The rotationally symmetric dielectric beam shaping structure according to claim 1,
wherein the focal point of the structure is configured to act as optical tweezers to trap particles and/or cells.

12. The single mode optical fiber having a structure according to claim 1.

13. A beam forming system comprising a single mode optical fiber according to claim 12 having a structure according to claim 1,
wherein the optical fiber is configured to be movable in an axial and/or transverse direction with respect to a common axis of symmetry,
wherein the structure is configured to hold a position of a trapped particle.

14. A method of manufacturing a rotationally symmetric dielectric structure for beam shaping according to claim 1,
wherein the structure is fabricated directly on a fiber tip using 3D printing or fabricated on a substrate and then attached to the fiber.

* * * * *